United States Patent Office 2,751,261
Patented June 19, 1956

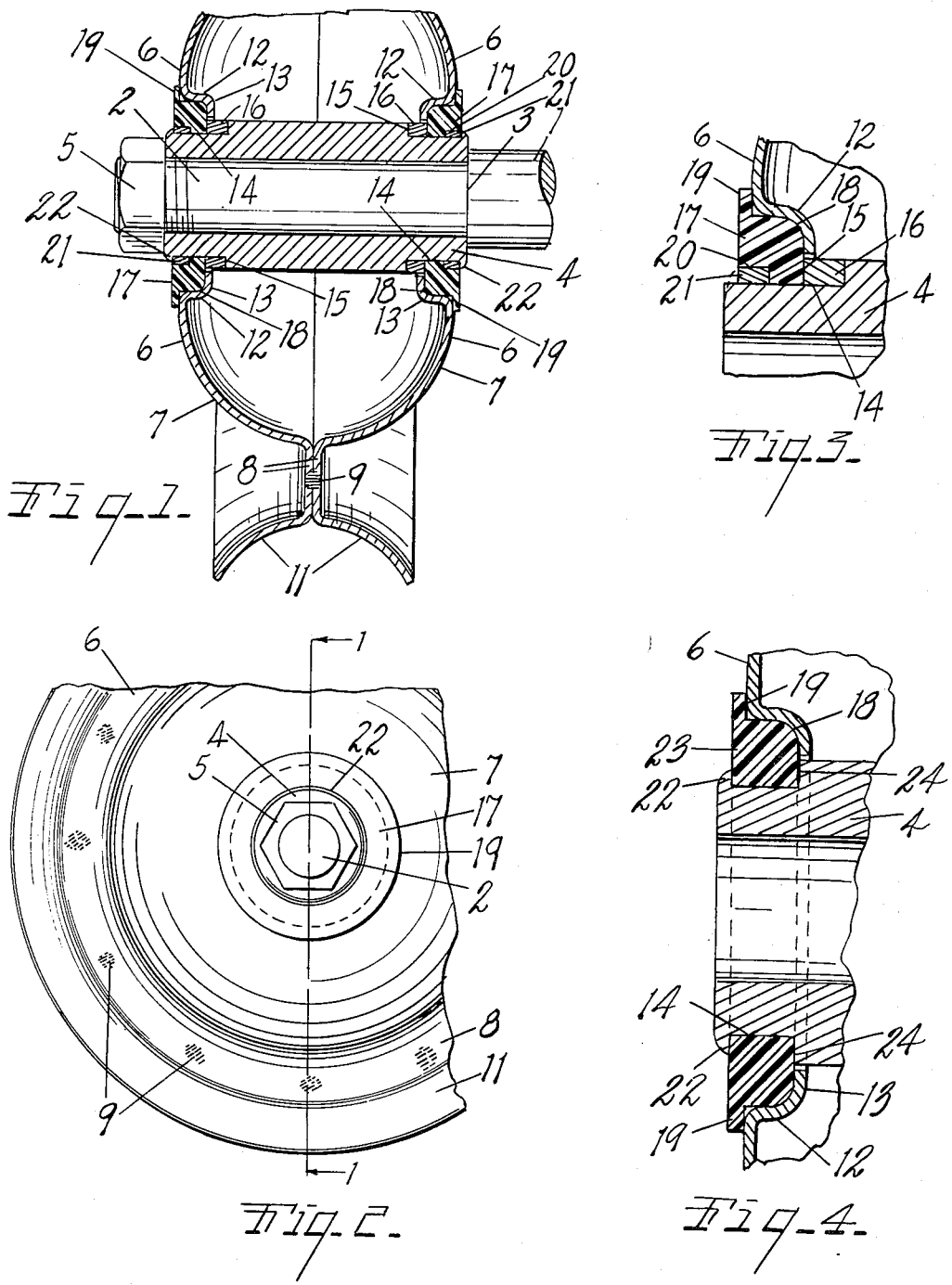

2,751,261

WHEEL AND BEARING ASSEMBLY

Carleton Wight Reade, Kalamazoo, Mich., assignor to Pemco Wheel Company, Kalamazoo, Mich.

Application August 31, 1953, Serial No. 377,601

8 Claims. (Cl. 308—16)

This invention relates to improvements in a wheel and bearing assembly.

The main objects of this invention are:

First, to provide a wheel and bearing assembly which does not require lubrication and is well adapted for use as caster wheels, in lawn mowers and various other relations where the use of a lubricant is undesirable.

Second, to provide a wheel and bearing assembly in which the wheel is formed of sheet metal stampings with integral bearing portions.

Third, to provide a wheel bearing assembly which may be manufactured as a unit and includes a tubular spindle which may be fixedly secured to a shaft or other spindle support.

Fourth, to provide a structure having these advantages in which the parts may be very economically produced and assembled.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in section on a line corresponding to line 1—1 of Fig. 2 of the wheel and bearing assembly of my invention, the tire being omitted.

Fig. 2 is a fragmentary elevational view looking from the left of Fig. 1.

Fig. 3 is an enlarged fragmentary view illustrating certain steps in the manufacture.

Fig. 4 is a fragmentary sectional view of a modified form of my invention.

In the accompanying drawing, 1 represents a fixed axle or spindle member having a reduced portion 2 shouldered at 3 to receive the tubular spindle member 4 of my invention, the spindle member being sleeved upon the reduced portion in supported engagement with the shoulder 3 and clamped thereon by the nut 5. The wheel members 6, 6 are formed of sheet stampings and comprise facing concavo-convex portions 7 and flat radially disposed portions 8 which are arranged in side by side contacting relation and connected by the spot welds 9. The portions 8 terminate in outwardly flared rim portions 11 which coact to provide a channeled rim to receive a tire, not illustrated.

The wheel members have inwardly offset bearing portions 12 at their inner edges, these being desirably of angular section and slightly curved at their angles 13. The axial portion of the bearing 12 comprises an annular bearing portion taking radial thrust. The radial portion of the bearing 12 comprises an annular bearing portion taking axial thrust.

The spindle member 4 has reduced cylindrical end portions 14 terminating in the outwardly facing annular shoulders 15. Thrust collars 16 are sleeved upon the reduced portion in abutting relation with the shoulders. The annular bearing members 17 are, in the preferred embodiment of my invention, of molded nylon and are fittingly sleeved upon the reduced portions of the spindle member. The bearing members 17 are peripherally conformed at 18 to coact with the angular bearing portions of the wheel members and have flanges 19 which overlap the outer sides of the wheel member and constitute means for excluding dirt, grit, and the like.

The bearing members have internal outwardly opening recesses 20 in which the retaining collars 21 are seated. The ends of the spindle member are upset at 22 to retainingly secure the bearing members to the spindle. These collars 21 are desirably of metal and they serve to protect the plastic bearing members during the upsetting operation of the spindle.

The applicant's wheel assembly requires no lubrication and may be fabricated as a unit at the factory and installed as a unit merely by sleeving the spindle member upon a supporting shaft or spindle and clamping it thereon as by the nut 5, as is illustrated in Fig. 1. The structure is desirable for use in many relations, particularly where the use of lubricant is not desirable. The parts may be economically produced and assembled.

In the embodiment of my invention shown in Fig. 4 the collar 21 and the thrust collar 16 are omitted, the bearing member 23 being in supported engagement with the shoulder 24 on the spindle member 4 and the upset 22 engages the bearing member 23 directly.

I have illustrated a simple and very practical embodiment of my invention. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. A wheel and bearing assembly comprising a tubular spindle having end portions with outwardly facing shoulders at the inner ends thereof, wheel members formed as sheet metal stampings and having facing concavo-convex inner portions, flat radial intermediate portions disposed in side by side relation and fixedly connected, and outwardly flaring outer portions coacting to constitute a channeled rim, the said inner portions having inwardly offset bearing portions of angular section, thrust collars sleeved upon said spindle end portions in abutting relation to said shoulders, annular bearing members of nylon supportedly sleeved upon said end portions of said spindle member at the outer sides of said thrust collars, said bearing members being peripherally conformed to coact with the angular bearing portions of said wheel members and having flanges engaging the outer sides of said wheel members, said bearing members having internal annular recesses opening at the outer sides thereof, and retaining collars disposed in said recesses in said bearing members and sleeved upon said spindle end portions, the ends of the spindle member being upset into retaining engagement with said retaining collars.

2. A wheel and bearing assembly comprising a tubular spindle having end portions with outwardly facing shoulders at the inner ends thereof, wheel members formed as sheet metal stampings and having facing concavo-convex inner portions, flat radial intermediate portions disposed in side by side relation and fixedly connected, and outwardly flaring outer portions coacting to constitute a channeled rim, the said inner portions having inwardly offset bearing portions, thrust collars sleeved upon said spindle end portions in abutting relation to said shoulders, annular bearing members supportedly sleeved upon said end portions of said spindle member at the outer sides of said thrust collars, said bearing members having internal annular recesses opening at the outer sides thereof, and retaining collars disposed in said recesses in said bearing members and sleeved upon said spindle end portions, the ends of the spindle member being upset into retaining engagement with said retaining collars.

3. A wheel and bearing assembly comprising a tubular spindle having outwardly facing shoulders spaced from the ends thereof, the wheel members having inwardly offset bearing portions of angular section, thrust collars sleeved upon said spindle member in abutting relation to said shoulders thereof, annular bearing members of plastic sleeved upon said spindle member at the outer sides of said thrust collars, said bearing members being peripherally conformed to coact with the angular bearing portions of said wheel members and having flanges engaging the outer sides of said wheel members, said bearing members having internal annular recesses opening at the outer sides thereof, and retaining collars disposed in said recesses in said bearing members and sleeved upon said spindle end portions, the ends of the spindle member being upset into engagement with said retaining collars.

4. A wheel and bearing assembly comprising a tubular spindle member adapted to be nonrotatably mounted on a supporting spindle, wheel members formed as sheet metal stampings and having axially spaced inner portions terminating in inwardly offset bearing members of angular section, spindle bearing members formed of plastic sleeved upon said spindle member and having annular bearing surfaces peripherally conformed to correspond to said angular wheel bearing members, and having internal annular recesses opening at the outer sides thereof, and retaining collars disposed in said recesses in said spindle bearing members and sleeved upon said spindle member in supported engagement therewith, the ends of the spindle member being upset into retaining engagement with said retaining collars to nonrotatably secured said spindle bearing members to the spindle member, said spindle bearing members acting to sustain the radial load and axial thrust of the wheel.

5. In a combination with a nonrotatable spindle having threads at its outer end and an outwardly facing shoulder spaced therefrom, a tubular spindle member sleeved upon said spindle with its inner end abutting said shoulder, a nut threaded upon said spindle in supporting engagement with the outer end of the spindle member to nonrotatably secure the same upon said spindle, a wheel comprising wheel members having axially spaced inner portions terminating in bearing members of angular section facing oppositely relative to each other, and spindle bearing members of plastic sleeved upon said spindle member in axially spaced relation and fixedly and nonrotatably secured thereto, said spindle bearing members being peripherally conformed to correspond with the said angular wheel bearing members and coacting therewith to rotatably support and retain the wheel upon the spindle member and sustain the radial load and axial thrust of the wheel.

6. A unitary wheel and bearing assembly comprising a tubular spindle member adapted to be nonrotatably mounted on a nonrotatable supporting spindle, a wheel comprising wheel members formed as sheet metal stampings and having axially spaced portions terminating in integrally formed inwardly offset bearing members of angle section and consisting of annular radial thrust bearing portions of substantial width and annular axial thrust bearing portions of substantial width disposed substantially at right angles to the axis of the spindle, said bearing portions being curvedly merged, said radial thrust bearing portions being curvedly merged into said axially spaced portions of said wheel members, and annular spindle bearing members of plastic sleeved upon and fixedly secured to said spindle member and having annular radial and axial thrust bearing surfaces coacting with the radial end thrust bearing surfaces of said wheel members and having annular peripheral flanges at their outer ends lapped upon the outer sides of said wheel members.

7. A unitary wheel and bearing assembly comprising a tubular spindle member adapted to be nonrotatably mounted on a nonrotatable supporting spindle, a wheel comprising wheel members formed as sheet metal stampings and having axially spaced portions terminating in integrally formed inwardly offset bearing members of angle section and consisting of annular radial thrust bearing portions of substantial width and annular axial thrust bearing portions of substantial width disposed substantially at right angles to the axis of the spindle, and annular spindle bearing members of plastic sleeved upon and fixedly secured to said spindle member and having annular radial and axial thrust bearing surfaces coacting with the radial end thrust bearing surfaces of said wheel members.

8. A unitary wheel and bearing assembly comprising a tubular spindle member adapted to be nonrotatably mounted on a supporting spindle, a wheel comprising wheel members formed as sheet metal stampings and having axially spaced inner portions terminating in integrally formed inwardly offset bearing members of angular section and comprising radial bearing portions and axial thrust bearing portions projecting inwardly therefrom and disposed in oppositely facing relation to each other, and spindle bearing members of plastic sleeved upon and nonrotatably secured to said spindle member in axially fixed relation thereto, and having annular radial and axial bearing surfaces peripherally conformed to fit and supportedly engage said wheel bearing members, and disposed in oppositely facing relation to each other and acting to retain the wheel and spindle member in assembled relation and sustain the radial load and axial thrust of the wheel.

References Cited in the file of this patent

UNITED STATES PATENTS

| | | |
|---|---|---|
| 2,173,584 | Frank | Sept. 19, 1939 |
| 2,479,538 | Liljenberg | Aug. 16, 1949 |
| 2,551,763 | Schley | May 8, 1951 |
| 2,643,917 | Douglas et al. | June 30, 1953 |

FOREIGN PATENTS

| | | |
|---|---|---|
| 351,735 | Great Britain | July 2, 1931 |

OTHER REFERENCES

Product Engineering, May 1948.